United States Patent
Tateishi et al.

(10) Patent No.: US 10,840,524 B2
(45) Date of Patent: Nov. 17, 2020

(54) BUILDING

(71) Applicant: TOYOTA JIDOSHA KABUSHIKI KAISHA, Toyota (JP)

(72) Inventors: Takaharu Tateishi, Nagoya (JP); Takahiro Ishizaki, Nagoya (JP); Mizuki Kiuchi, Toyota (JP); Yusuke Kaneko, Toyota (JP); Kazuhiko Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/536,390

(22) Filed: Aug. 9, 2019

(65) Prior Publication Data

US 2020/0083548 A1 Mar. 12, 2020

(30) Foreign Application Priority Data

Sep. 11, 2018 (JP) .................. 2018-169361

(51) Int. Cl.
*H01M 8/04082* (2016.01)

(52) U.S. Cl.
CPC .... *H01M 8/04216* (2013.01); *H01M 2250/10* (2013.01)

(58) Field of Classification Search
CPC ......... H01M 8/04216; H01M 2250/10; H01M 8/04201; H01M 8/0606; Y02E 60/50; Y02B 90/10; E04B 1/00
See application file for complete search history.

(56) References Cited

U.S. PATENT DOCUMENTS

| 6,689,507 | B1 * | 2/2004 | Tsutsumi | B60L 50/64 |
| | | | | 429/67 |
| 2010/0239929 | A1 * | 9/2010 | Kajiwara | H01M 8/0438 |
| | | | | 429/431 |
| 2010/0248062 | A1 * | 9/2010 | Ishikawa | H01M 8/04425 |
| | | | | 429/444 |
| 2010/0326424 | A1 * | 12/2010 | Bennett | F02G 1/0435 |
| | | | | 126/600 |
| 2011/0027679 | A1 * | 2/2011 | Nonobe | H01M 8/04947 |
| | | | | 429/432 |
| 2013/0137006 | A1 * | 5/2013 | Morita | H01M 8/04228 |
| | | | | 429/423 |
| 2013/0177825 | A1 * | 7/2013 | Tatsui | H01M 8/04067 |
| | | | | 429/423 |
| 2013/0337354 | A1 * | 12/2013 | Tatsui | H01M 8/04268 |
| | | | | 429/429 |
| 2015/0044585 | A1 * | 2/2015 | Morita | H01M 8/04776 |
| | | | | 429/423 |
| 2015/0147672 | A1 * | 5/2015 | Tatsui | H01M 8/04619 |
| | | | | 429/440 |
| 2017/0336029 | A1 * | 11/2017 | Kernene | F17C 11/005 |

FOREIGN PATENT DOCUMENTS

JP 2001210351 A 8/2001

* cited by examiner

*Primary Examiner* — Joshua K Ihezie
(74) *Attorney, Agent, or Firm* — Dickinson Wright PLLC

(57) ABSTRACT

A building comprises a structural material configured to form a framework of the building; a hydrogen storing alloy integrated with the structural material; a temperature regulator provided inside of the structural material such as to regulate temperature of the structural material; and a piping provided inside of the structural material such as to cause hydrogen taken out from the hydrogen storing alloy to flow therethrough.

5 Claims, 5 Drawing Sheets

BUILDING

CROSS REFERENCE TO RELATED APPLICATIONS

The present application claims priority from Japanese patent application 2018-169361 filed on Sep. 11, 2018, the entirety of the content of which is hereby incorporated by reference into this application.

BACKGROUND

Field

The present disclosure relates to a building.

Related Art

Hydrogen is used for industrial applications and is also used to be converted into various energies, such as heat and electricity. Recently, along with popularization of fuel cell systems using hydrogen, various methods have been examined to supply electric power generated by a fuel cell that receives a supply of hydrogen, to inside of a building. For example, JP 2001-210351A describes a building equipped with a fuel cell system that uses a reforming device to take out hydrogen from a gas supplied from outside and to use the hydrogen for power generation.

The techniques described above, however, require an additional equipment serving as a supply source of a gas to be provided separately from the building, in order to supply the gas to inside of the building. In the case where no such an equipment as the supply source of the gas is installed, a space is required in the building to place a container that is used to store hydrogen. There is accordingly a demand for a technique of supplying hydrogen without requiring any additional equipment serving as a supply source of a gas and without requiring any space for storing hydrogen in the building.

SUMMARY

According to one aspect of the present disclosure, there is provided a building. This building comprises a structural material configured to form a framework of the building; a hydrogen storing alloy integrated with the structural material; a temperature regulator provided inside of the structural material such as to regulate temperature of the structural material; and a piping provided inside of the structural material such as to cause hydrogen taken out from the hydrogen storing alloy to flow therethrough. In the building of this aspect, temperature regulation by the temperature regulator enables hydrogen to be obtained from the hydrogen storing alloy that is included in the structural material forming the framework of the building and to be supplied through the piping. This configuration enables hydrogen to be supplied without installing any equipment that serves as a supply source of hydrogen separately from the building and without placing a container used to store hydrogen in the building.

DETAILED DESCRIPTION

A. First Embodiment

Figure 1:
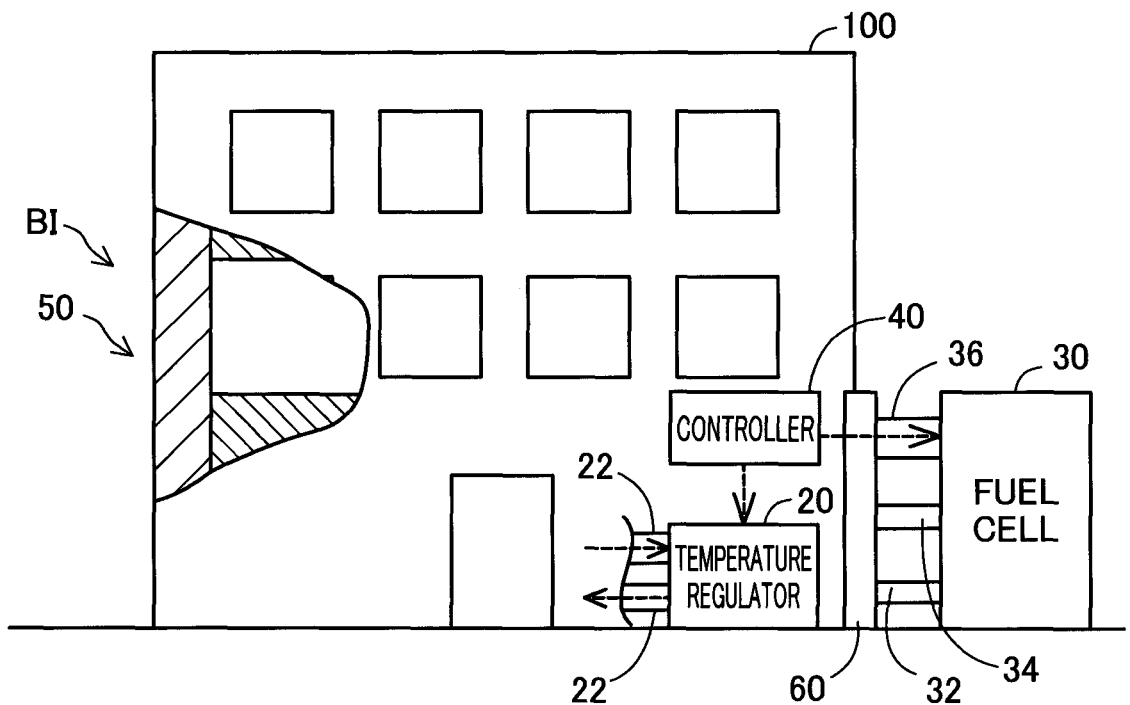
FIG. 1 is a diagram schematically illustrating a building according to a first embodiment.

FIG. 1 is a diagram schematically illustrating a building 100 according to a first embodiment. According to this embodiment, the building 100 is a steel framed concrete hospital building having a framework 50. The building 100 is, however, not limited to the hospital building but may be a general public facility such as a school building or a community center building or any of various buildings usable as a shelter in the event of some disaster. The building 100 is equipped with a controller 40 and a temperature regulator 20.

The controller 40 is configured by a computer including a CPU serving as one or a plurality of processors and a memory serving as a main storage unit. The processor executes programs and commands loaded on the main storage unit, so that the controller 40 controls the respective parts of the building 100 and exerts various functions. According to a modification, the controller 40 may be configured by combination of a plurality of circuits that respectively implement at least parts of the respective functions, in place of being configured by the computer.

The temperature regulator 20 is a temperature regulating device utilizing a liquid. According to the embodiment, the temperature regulator 20 is provided inside of the building 100. The temperature regulator 20 includes a temperature regulating pipe 22 arranged to cause the liquid to flow inside thereof, a circulation pump (not shown) and a heat exchanger (not shown). The temperature regulating pipe 22 serves as a flow path of the liquid that is provided inside of the framework 50 of the building 100 and that is laid throughout inside of the building 100. The temperature regulator 20 serves to regulate the water temperature according to a set value by using the heat exchanger and to cause the temperature-regulated water to flow in the temperature regulating pipe 22 by using the circulation pump. This configuration enables the temperature of the framework 50 throughout the building 100 to be regulated according to the set value.

Figure 2:
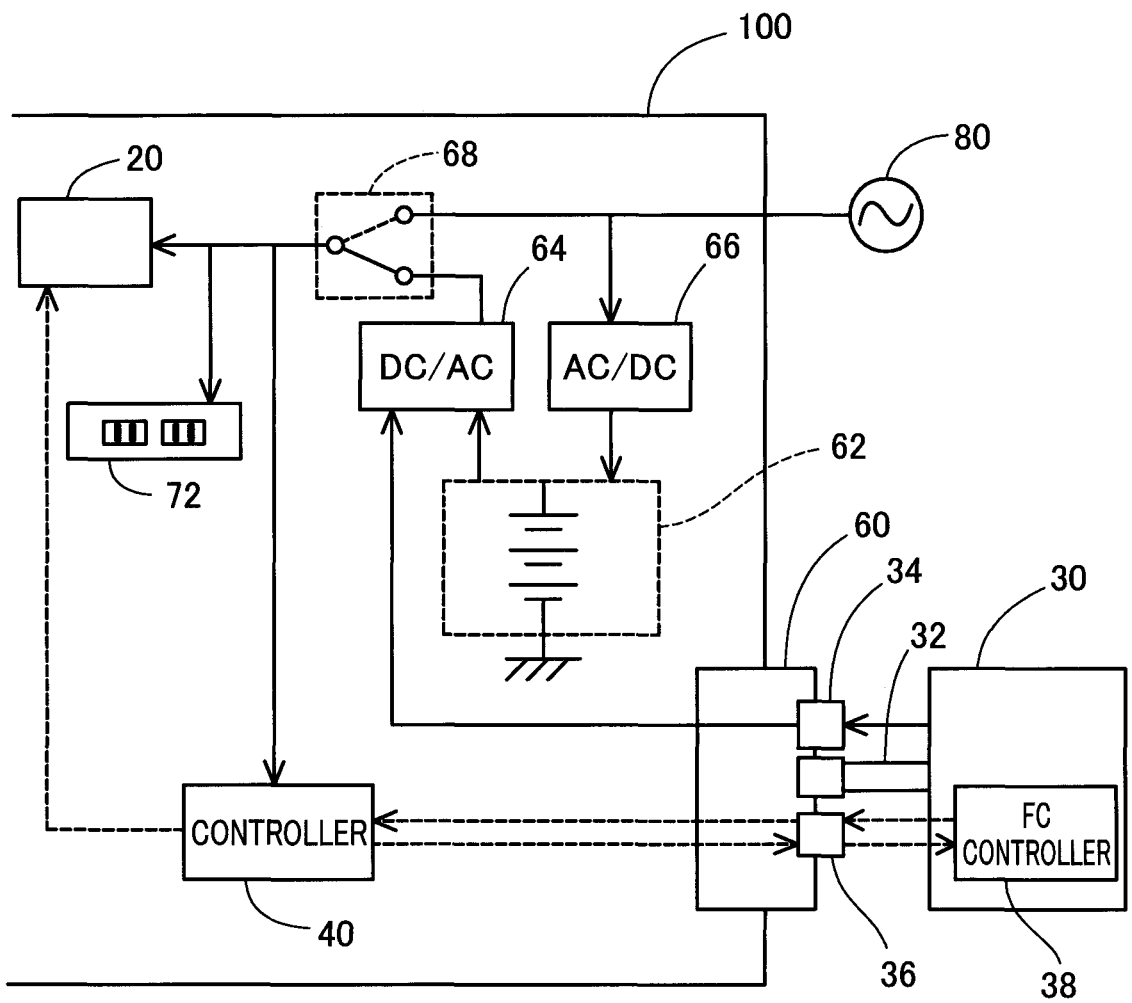
FIG. 2 is a diagram schematically illustrating the configuration of electrical wiring of the building.

The following describes a method of supplying electric power to the building 100 with referring to FIG. 2. FIG. 2 is a diagram schematically illustrating the configuration of electrical wiring of the building 100. According to the embodiment, the building 100 is equipped with a connection unit 60, an uninterruptible power source 62, a DC-AC inverter 64, an AC-DC converter 66, a relay 68 and a power feeder 72, in addition to the controller 40 and the temperature regulator 20 described above. At the normal time, the building 100 is not connected with a fuel cell 30 but receives a supply of electric power from a commercial power supply 80. In the event of an emergency such as interruption of power supply, on the other hand, the building 100 is connected with the fuel cell 30.

The fuel cell 30 is an external unit provided independently of the building 100 and is connected with the building 100 via the connection unit 60. The fuel cell 30 is a polymer electrolyte fuel cell that receives supplies of hydrogen and the air (more specifically, oxygen) to generate electricity. The fuel cell 30 is configured as a fuel cell stack that is formed by stacking unit cells. Each unit cell has a membrane electrode assembly formed by placing electrodes on respective surfaces of an electrolyte membrane. The fuel cell 30 is equipped with an FC controller 38 that has a similar configuration to the configuration of the controller 40. The connection unit 60 includes a hydrogen supply pipe 32, a power supplier 34 and an input/output interface 36.

The hydrogen supply pipe 32 serves as a piping to supply hydrogen that is supplied from the building 100, to an anode gas supply port (manifold hole) (not shown) of the fuel cell 30. The hydrogen supply pipe 32 is equipped with an injector (not shown) to regulate the amount of hydrogen that is to be supplied to the fuel cell 30. A method of supplying hydrogen from the building 100 will be described later.

The power supplier 34 serves as a power connector to supply electric power generated by the fuel cell 30 to the building 100. The input/output interface 36 serves as an input/output port to input and output signals from and to the FC controller 38 and the controller 40.

The building 100 is generally configured to supply electric power that is fed from the commercial power supply 80, via the relay 68 to the temperature regulator 20, to the power feeder 72 that is provided to supply electric power to a load, and to the controller 40. Possible examples of the load include various devices for lighting, air conditioning, power supply and operations provided in the hospital building as the building 100. The AC-DC converter 66 is connected with the commercial power supply 80 to convert AC power from the commercial power supply 80 into DC power and to supply the converted DC power to the uninterruptible power source 62 configured as a secondary battery and thereby charge the uninterruptible power source 62 with the DC power.

In the building 100, when supply of electric power from the commercial power supply 80 is cut off due to, for example, interruption of power supply, the wiring is changed over by the relay 68. In this state, the uninterruptible power source 62 serves as an initial power supply of the building 100, in place of the commercial power supply 80. The DC power supplied from the uninterruptible power source 62 is converted into AC power of 100 V by the DC-AC inverter 64 and is supplied to the temperature regulator 20, the power feeder 72 and the controller 40 via the relay 68. When the fuel cell 30 is connected with the building 100 via the connection unit 60, the controller 40 makes communication with the FC controller 38 and gives an instruction to start power generation by the fuel cell 30. The electric power supplied from the fuel cell 30 substitutes or complements the power supply from the uninterruptible power source 62. The electric power supplied from the fuel cell 30 is supplied through the DC-AC inverter 64 to the temperature regulator 20, the power feeder 72 and the controller 40.

Figure 3:
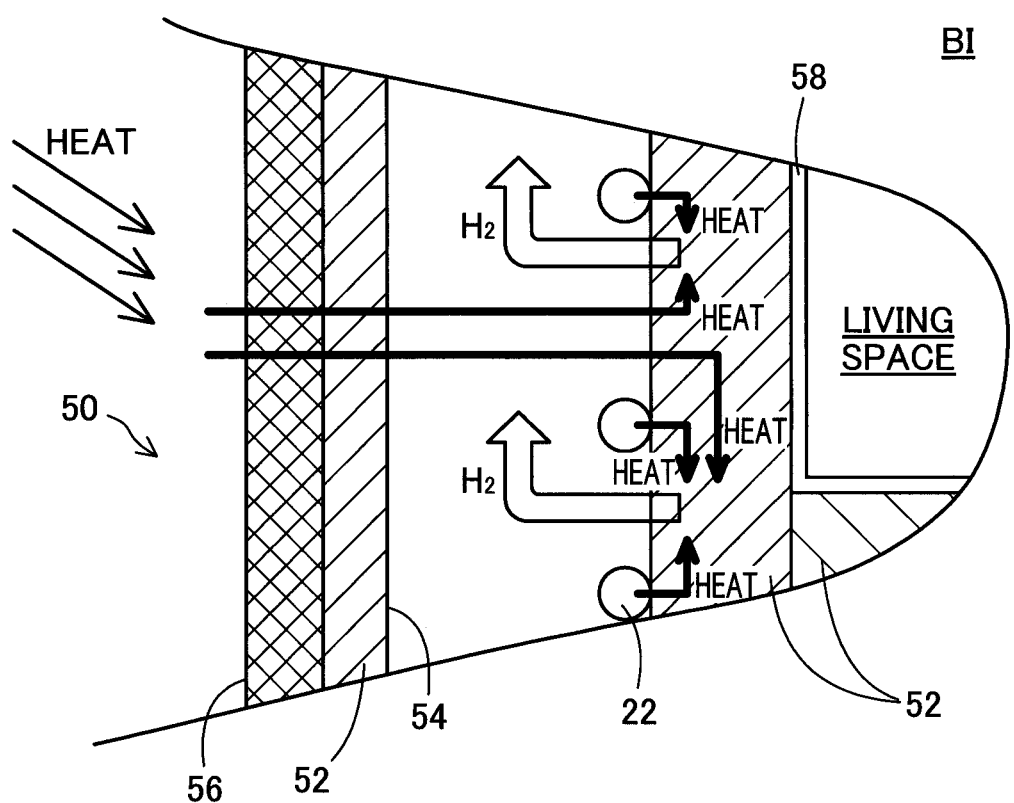
FIG. 3 is a closeup view schematically illustrating the internal structure in the periphery of an outside wall of the building shown in FIG. 1.

FIG. 3 is a closeup view schematically illustrating an internal structure BI in the periphery of an outer wall of the building 100 shown in FIG. 1. The framework 50 of the building 100 includes a structural material 52, a piping 54, an outer wall 56 and a seal member 58.

The structural material 52 is reinforced concrete including steel frame inside thereof and forms a framework of the entire building 100. According to the embodiment, hydrogen storing alloy is incorporated in to be integrated with the structural material 52. The expression of "integrating the hydrogen storing alloy with the structural material 52" means that a structure of hydrogen storing alloy configured as a different unit from the structural material 52 is assembled to the structural material 52 to constitute the integrated structural material 52. This configuration is, however, not essential. According to other embodiments, the integrated structural material 52 may be configured by mixing the hydrogen storing alloy with the structural material 52 or may be configured by applying the hydrogen storing alloy to the structural material 52. The hydrogen storing alloy denotes a metal material that is capable of storing hydrogen between crystal lattices of metal and that reversibly absorbs and releases hydrogen with a temperature change. According to the embodiment, $LaNi_5$ that is an $AB_5$-type rare earth alloy is used as the hydrogen storing alloy. The hydrogen storing alloy that stores hydrogen therein is included inside of units and is incorporated in the structural material 52 to form, along with the structural material 52, part of the framework of the building 100. According to this embodiment, stainless steel units including a hydrogen storing alloy inside thereof are used to provide the structural material 52 with high strength. At the normal time, the structural material 52 is maintained at ordinary temperature or therearound by circulation of temperature-regulated water in the temperature regulating pipe 22 by the temperature regulator 20. In this state, the hydrogen storing alloy incorporated in the structural material 52 does not obtain heat of reaction required for releasing hydrogen and keeps hydrogen stored inside thereof.

The piping 54 is a space provided inside of the structural material 52. The piping 54 serves as a flow path of hydrogen taken out of the hydrogen storing alloy in the structural material 52. The outer wall 56 is a wall surface forming the outer shell of the building 100. According to the embodiment, a general material that does not include the hydrogen storing alloy is used for the outer wall 56. The outer wall 56 is placed on the outer side of the structural material 52 in the building 100 and serves to prevent hydrogen taken out of the structural material 52 from leaking out. The seal member 58 is provided along a wall surface on the living space side of the building 100. The seal member 58 serves to prevent hydrogen taken out of the structural material 52 from entering the living space.

Figure 4:
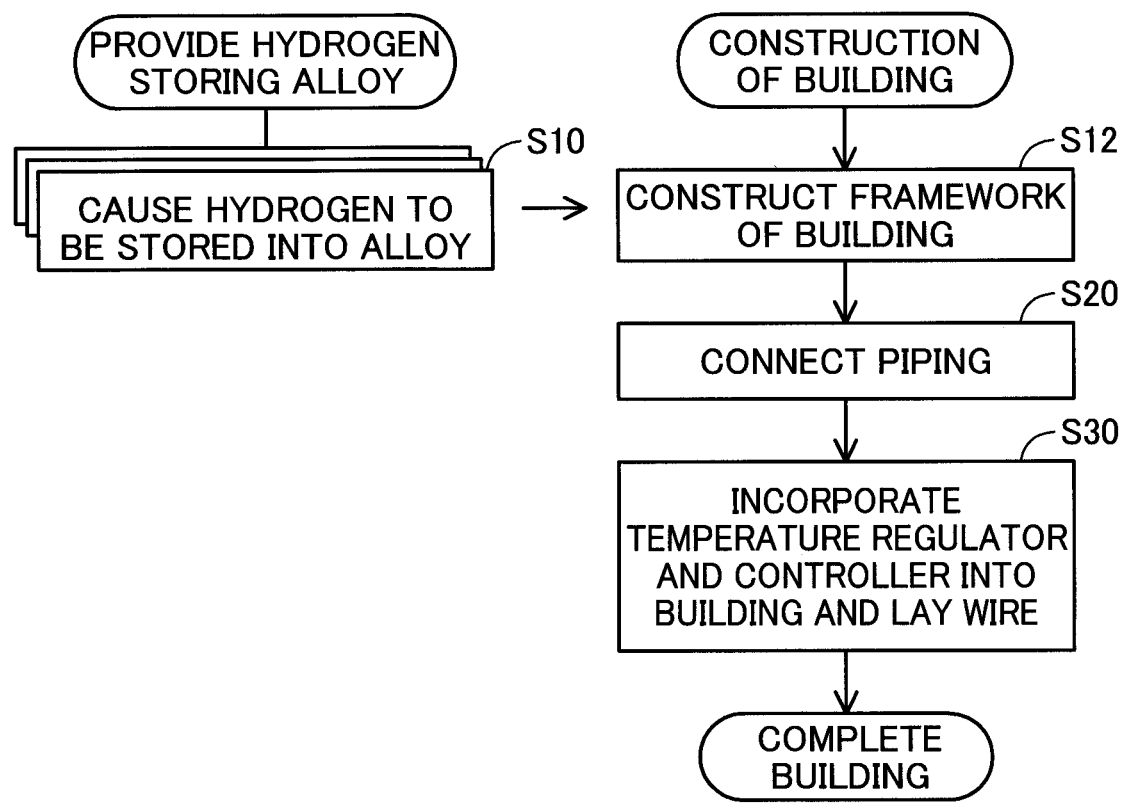
FIG. 4 is a process chart showing a construction process of the building according to the first embodiment.

FIG. 4 is a process chart showing a construction process of the building 100 according to the embodiment. The construction process first provides a plurality of units that are made of the hydrogen storing alloy $LaNi_5$ and that are to be incorporated in the structural material 52 (step S10), before starting construction of the building 100. An exemplary procedure may regulate the temperature and the pressure to be suitable for storage of hydrogen by the hydrogen storing alloy $LaNi_5$, cause hydrogen gas to be adsorbed on the surface of the hydrogen storing alloy and then cause hydrogen to be separated in the form of atoms and enter the hydrogen storing alloy. The piping 54 and the temperature regulating pipe 22 are built in advance in the stainless units including the hydrogen storing alloy $LaNi_5$. The construction process subsequently constructs the framework 50 of the building 100 (step S12). The units of the hydrogen storing alloy $LaNi_5$ described above are incorporated in the structural material 52 of the framework 50. Pipings and temperature regulating pipes of the respective units of the hydrogen storing alloy $LaNi_5$ are connected with a piping and a temperature regulating pipe provided in the structural material 52, so as to form one piping 54 and one temperature regulating pipe 22 as a whole (step S20). Assembling the seal member 58 and the outer wall 56 with the structural material 52 completes the framework 50 of the building 100. The construction process incorporates the temperature regulator 20 and the controller 40 into the building 100 along with completion of the framework 50 and completes electrical wiring and connection of pipings in the respective parts of the building 100 (step S30). This completes the building 100.

Figure 5:
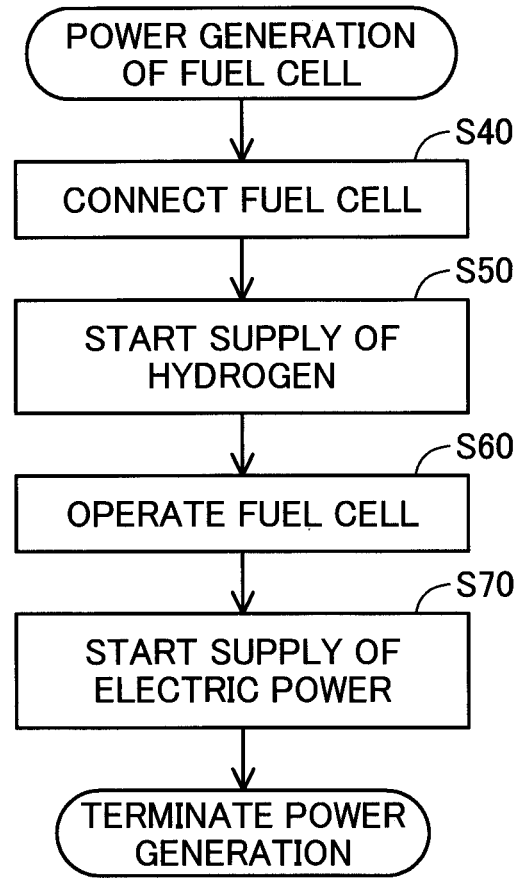
FIG. 5 is a process chart showing a method of using a fuel cell connected with the building according to the first embodiment.

The following describes a method of supplying hydrogen to the fuel cell 30 and a method of generating electricity performed in the building 100 according to the embodiment with reference to FIG. 3 as well as FIG. 5. FIG. 5 is a process chart showing a method of using the fuel cell 30 connected with the building 100 according to this embodiment.

In the building 100, at the time when there is a requirement for power generation by the fuel cell 30, the fuel cell 30 is connected with the building 100 by means of the connection unit 60 (step S40). The "time when there is a requirement for power generation by the fuel cell 30" denotes the time when there is a need for the fuel cell 30 to supply electric power to the building 100, for example, the time of interruption of power supply due to some natural disaster or another reason. This time may not be limited to the event of an emergency but may be set to any timing when there is a need to supply electric power to the building 100, for example, the time when the user performs a start operation of the controller 40 or the time when the fuel cell 30 is connected with the building 100.

In the building 100 connected with the fuel cell 30, the controller 40 controls the temperature regulator 20 and starts supply of hydrogen to the fuel cell 30 (step S50). More specifically, the controller 40 controls the heat exchanger to raise the temperature of the temperature-regulated water used by the temperature regulator 20 to a temperature TH or thereround. The temperature TH denotes a temperature that allows the hydrogen storing alloy to release hydrogen and that is specified by the pressure of hydrogen stored in the hydrogen storing alloy. According to the embodiment, the temperature TH is set to 40 degrees Celsius. The temperature-raised temperature-regulated water is spread over the entire building 100 via the temperature regulating pipe 22 by means of the circulation pump. This causes the temperature of the structural material 52 in the building 100 to the temperature TH or thereround. As shown in FIG. 3, the hydrogen storing alloy incorporated in the structural material 52 has an endothermic reaction to release hydrogen with a temperature rise by the temperature regulator 20. In the building 100 of the embodiment, external thermal energy, such as solar heat absorbed from solar light which the outside wall 56 is irradiated with may additionally be used for release of hydrogen. In the building 100 of the embodiment, the external thermal energy is also used for the temperature regulation that maintains the temperature of the structural material 52 at ordinary temperature as described above at the ordinary time other than the time of emergency. The hydrogen released from the structural material 52 is led to the piping 54. The hydrogen in the piping 54 flows through the inside of the building 100 and is led to the hydrogen supply pipe 32 of the fuel cell 30. The temperature of the temperature-raised temperature-regulated water may not be limited to the temperature TH but may be set to any temperature suitable for the release of hydrogen according to the type of the hydrogen storing alloy incorporated in the structural material 52.

The fuel cell 30 receives the supply of hydrogen from the building 100 and starts operation (step S60). More specifically, the fuel cell 30 receives the supply of hydrogen as an anode gas that is supplied from the building 100 through the hydrogen supply pipe 32 and the supply of the air (or more specifically, the supply of oxygen) that is taken into a cathode gas supply port from the outside by means of an air compressor, and starts power generation. At this time, the FC controller 38 controls the injector to regulate the amount of power generation according to the settings of a driving cycle and a valve-opening time.

The controller 40 then starts supply of the electric power generated by the fuel cell 30 to the building 100 via the power supplier 34 (step S70). As described above, the electric power supplied from the fuel cell 30 is converted into AC power of 100 V by the power supplier 34. This enables electric power to be supplied to the load connected with the power feeder 72 provided in the building 100. As described above, the building 100 of the embodiment performs temperature regulation by the temperature regulator 20 to take out hydrogen from the hydrogen storing alloy integrated with the structural material 52 and supplies the taken-out hydrogen to the fuel cell 30 to start power generation.

In the building 100 of the embodiment, temperature regulation by the temperature regulator 20 enables hydrogen to be supplied from the structural material 52 that forms the framework of the building 100. This configuration enables hydrogen to be supplied without installing any equipment that serves as a supply source of hydrogen separately from the building 100 and without placing a container used to store hydrogen in the building 100. This configuration also enables the building 100 to perform private power generation by using the fuel cell 30 connected with the building 100 and hydrogen supplied from the building 100. Accordingly, the building 100 may be utilized as a facility for emergency, such as a shelter.

In the building 100 of the embodiment, the hydrogen storing alloy is placed in the structural material 52 that is provided in the vicinity of the outside wall 56 of the building 100. This configuration enables the building 100 to use the external thermal energy from outside of the building 100, such as solar heat, to regulate the temperature of the building 100 and to release hydrogen from the hydrogen storing alloy, in addition to the temperature regulation by the temperature regulator 20.

B. Other Embodiments (B1) According to the embodiment described above, the structure of the building 100 is steel framed concrete structure. According to other embodiments, the building 100 may employ any of various building structures and various construction methods, such as steel framed reinforced concrete structure, reinforced concrete structure or steel structure and may employ any of various constructions provided with a structural material including hydrogen storing alloy in the framework of the building.

(B2) According to the embodiment described above, the temperature regulator 20 is the temperature regulating device utilizing the liquid. The temperature regulator 20 may not be, however, necessarily limited to the temperature regulating device utilizing the liquid but may be any of various temperature regulating devices, for example, a temperature regulating device utilizing electricity such as a thermocouple or a temperature regulating device utilizing a gas.

(B3) According to the embodiment described above, $LaNi_5$ that is an $AB_5$-type rare earth alloy is used as the hydrogen storing alloy. According to other embodiments, the hydrogen storing alloy used may be any of various other $AB_5$-type rare earth alloys having the same crystal structure as the crystal structure of $LaNi_5$, for example, $CaCu_5$ or MmNi$_5$ or may be any of various hydrogen storing alloys having different crystal structures from the crystal structure of the AB$_5$-type rare earth alloy, for example, an AB$_2$-type Laves phase alloy, an AB-type titanium alloy, an A$_2$B-type magnesium alloy, or a solid solution-type body-centered cubic crystal alloy. In such modifications, the temperature to be raised by the temperature regulator 20 with a view to supplying hydrogen should be set according to the hydrogen storing alloy employed.

(B4) According to the embodiment described above, the fuel cell 30 is an external unit provided separately from the building 100. According to another embodiment, the building 100 may be configured to be always provided with the fuel cell 30. This modification enables the building 100 to be always provided with the fuel cell 30 and hydrogen supplied from the hydrogen storing alloy and thereby enables the building 100 to perform private power generation promptly.

(B5) According to the embodiment described above, the hydrogen storing alloy is incorporated in the structural material 52 of the internal structure BI in the vicinity of the outside wall of the building 100. According to another embodiment, the hydrogen storing alloy may not be necessarily limited to be incorporated in the structural material 52 in the vicinity of the outside wall of the building 100 but may be incorporated in the structural material 52 of the entire framework 50 of the building 100.

(B6) According to the embodiment described above, the polymer electrolyte fuel cell is employed as the fuel cell 30. This is, however, not essential, but the fuel cell 30 may be any of various fuel cells, for example, a solid oxide fuel cell, a molten carbonate fuel cell or a phosphoric acid fuel cell.

(B7) In the building 100 of the embodiment described above, hydrogen is released from the hydrogen storing alloy. This configuration is, however, not essential, but the hydrogen storing alloy that releases hydrogen may be refilled with hydrogen by storing hydrogen again into the hydrogen storing alloy.

(B8) In the building 100 of the embodiment described above, hydrogen released from the hydrogen storing alloy is used for power generation by the fuel cell 30. The method of using hydrogen supplied from the building 100 is, however, not limited to this embodiment. For example, hydrogen supplied from the building 100 may be subjected to any of various methods of using hydrogen, for example, a method of supplying hydrogen to a vehicle equipped with a hydrogen combustion-type engine, a method of filling a balloon with hydrogen for emergency display or any of various industrial applications.

The present disclosure is not limited to any of the embodiment and the other embodiments described above but may be implemented by various other configurations without departing from the scope of the disclosure. For example, the technical features of any of the above embodiment may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the present disclosure, there is provided a building. This building comprises a structural material configured to form a framework of the building; a hydrogen storing alloy integrated with the structural material; a temperature regulator provided inside of the structural material such as to regulate temperature of the structural material; and a piping provided inside of the structural material such as to cause hydrogen taken out from the hydrogen storing alloy to flow therethrough. In the building of this aspect, temperature regulation by the temperature regulator enables hydrogen to be obtained from the hydrogen storing alloy that is included in the structural material forming the framework of the building and to be supplied through the piping. This configuration enables hydrogen to be supplied without installing any equipment that serves as a supply source of hydrogen separately from the building and without placing a container used to store hydrogen in the building.

(2) In the building of the above aspect, the hydrogen storing alloy may be placed in a structural material provided in a neighborhood of an outside wall of the building. In the building of this aspect, the hydrogen storing alloy is placed in the structural material provided in the vicinity of the outer wall of the building. This configuration enables the building to use external thermal energy from outside of the building, such as solar heat, to regulate the temperature of the building and to release hydrogen from the hydrogen storing alloy, in addition to the temperature regulation by the temperature regulator.

(3) The building of the above aspect may further comprise a fuel cell configured to receive a supply of the hydrogen supplied through the piping and a supply of the air and to generate electric power.

The configuration of this aspect enables the building to perform private power generation by using the fuel cell provided in the building and hydrogen supplied from the building. Accordingly, the building may be utilized as a facility for emergency, such as a shelter.

The present disclosure may be implemented by any of various aspects other than the aspects of the building described above. For example, the present disclosure may be implemented by a method of supplying hydrogen gas, construction of the building, structure of the building, a method of producing the building, a control method of the building, a computer program configured to implement the control method, and a non-transitory recording medium in which the computer program is recorded.

What is claimed is:

1. A building, comprising:
   A building structural member comprising a framework of the building;
   a hydrogen storing alloy integrated with the building structural member;
   a temperature regulator provided inside of the building structural member such as to regulate temperature of the building structural member and thereby cause stored hydrogen to be supplied from the hydrogen storing alloy to a piping; and
   the piping provided inside of the structural member such as to cause hydrogen taken out from the hydrogen storing alloy to flow therethrough.

2. The building according to claim 1,
   wherein the hydrogen storing alloy is placed in a structural member provided in a neighborhood of an outer wall of the building.

3. The building according to claim 1, further comprising:
   a fuel cell configured to receive a supply of the hydrogen supplied through the piping and a supply of air and to generate electric power.

4. The building according to claim 1,
   wherein the temperature regulator includes a temperature regulating pipe; and the temperature regulating pipe is laid throughout inside of the building and utilizing liquid such as to regulate temperature of the structural member.

5. The building of claim 1, wherein the framework comprises at least one of a wall, a floor, a framework, and a post.

* * * * *